United States Patent [19]

Hatta

[11] Patent Number: 4,780,825

[45] Date of Patent: Oct. 25, 1988

[54] TEXT COMPILING DEVICE

[75] Inventor: Koichi Hatta, Yamatokoriyama, Japan

[73] Assignee: Sharp Kabushiki Kaisha, Osaka, Japan

[21] Appl. No.: 736,699

[22] Filed: May 22, 1985

[30] Foreign Application Priority Data

May 22, 1984 [JP] Japan ............................... 59-104211

[51] Int. Cl.⁴ ........................ G06F 9/10; G06F 15/38
[52] U.S. Cl. .................................. 364/419; 364/200; 364/900
[58] Field of Search ... 364/200 MS File, 900 MS File, 364/419, 300

[56] References Cited

U.S. PATENT DOCUMENTS

| | | | |
|---|---|---|---|
| 4,099,230 | 7/1978 | Mead | 364/200 |
| 4,127,897 | 11/1978 | Spangler et al. | 364/900 |
| 4,366,553 | 12/1982 | Spangler et al. | 369/900 |
| 4,533,997 | 8/1985 | Furgeison | 364/300 |

*Primary Examiner*—Jerry Smith
*Assistant Examiner*—Charles B. Meyer
*Attorney, Agent, or Firm*—Birch, Stewart, Kolasch & Birch

[57] ABSTRACT

A text compiling device includes a first memory area for storing an intervening code program in which a statement or comment is given by a code. The intervening code is read out and is converted to an ASCII code program. The converted ASCII code program is stored in a second memory area, which partly overlaps with the first memory area. Similarly, a reverse conversion can be carried out.

6 Claims, 6 Drawing Sheets

Fig. 6
Fig. 7
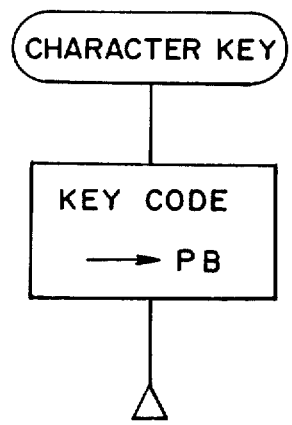
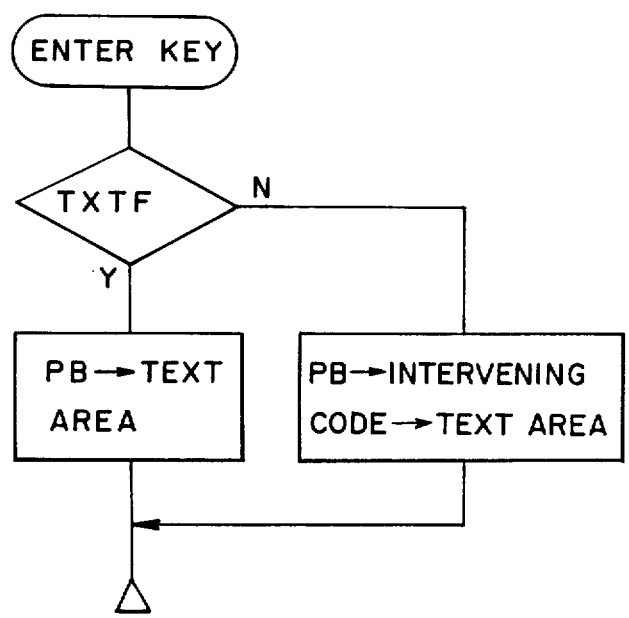

TEXT COMPILING DEVICE

BACKGROUND OF THE INVENTION

1. Field of the Invention

The present invention relates to a portable microcomputer, or calculator, having a size sufficiently small for being carried in a pocket (referred to as a pocket computer) and, more particularly, to a test compiling device employed in the pocket computer.

2. Description of the Prior Art

Generally, the pocket computer has, for example, a number of keys, through which a program is inputted. The program as inputted by the keys is converted into an intervening code and then stored in a memory unit. To run the program, the intervening code is read out from the memory unit and is interpreted as a machine language.

However, the rules and meanings used for the intervening code differs between different types of computers and calculators. Therefore, the different types of computers have no, or very poor, compatibility between them. Even when the language for the source program is the same, it is actually impossible to make a program that can properly run a computer of a different type. Also, according the prior art pocket computer, although it is possible to freely compile the program when the computer is set in the program input mode, it is impossible to form a desired text file using the program compile function.

SUMMARY OF THE INVENTION

The present invention has been developed with a view to substantially solving the above described problems and has for its essential object to provide an improved text compiling device for a pocket computer.

It is also an essential object of the present invention to provide a text compiling device which can convert the program expressed by the intervening code to a program expressed by a character code such as ASCII code.

It is a further object of the present invention to provide a text compiling device which can form a desired text file and which can convert the text file to the program expressed by the intervening code.

It is another object of the present invention to provide a text compiling device which can form a text file or a program having a compatibility with a different type of computer.

In accomplishing these and other objects, the text compiling device according to the present invention comprises, first storing means for storing a program given by a first coding system, reading means for reading the program given by the first coding system as stored in the first storing means, converting means for converting the read program in the first coding system to a program given by a second coding system; and second storing means for storing the converted program in the second coding system.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects and features of the present invention will become apparent form the following description taken in conjunction with a preferred embodiment thereof with reference to the accompanying drawings, throughout which like parts are designated by like reference numerals, and in which:

FIGS. 6 and 7 are flow charts each showing an operation when a program is inputted through the keys.

DESCRIPTION OF THE PREFERRED EMBODIMENTS

Figure 1:
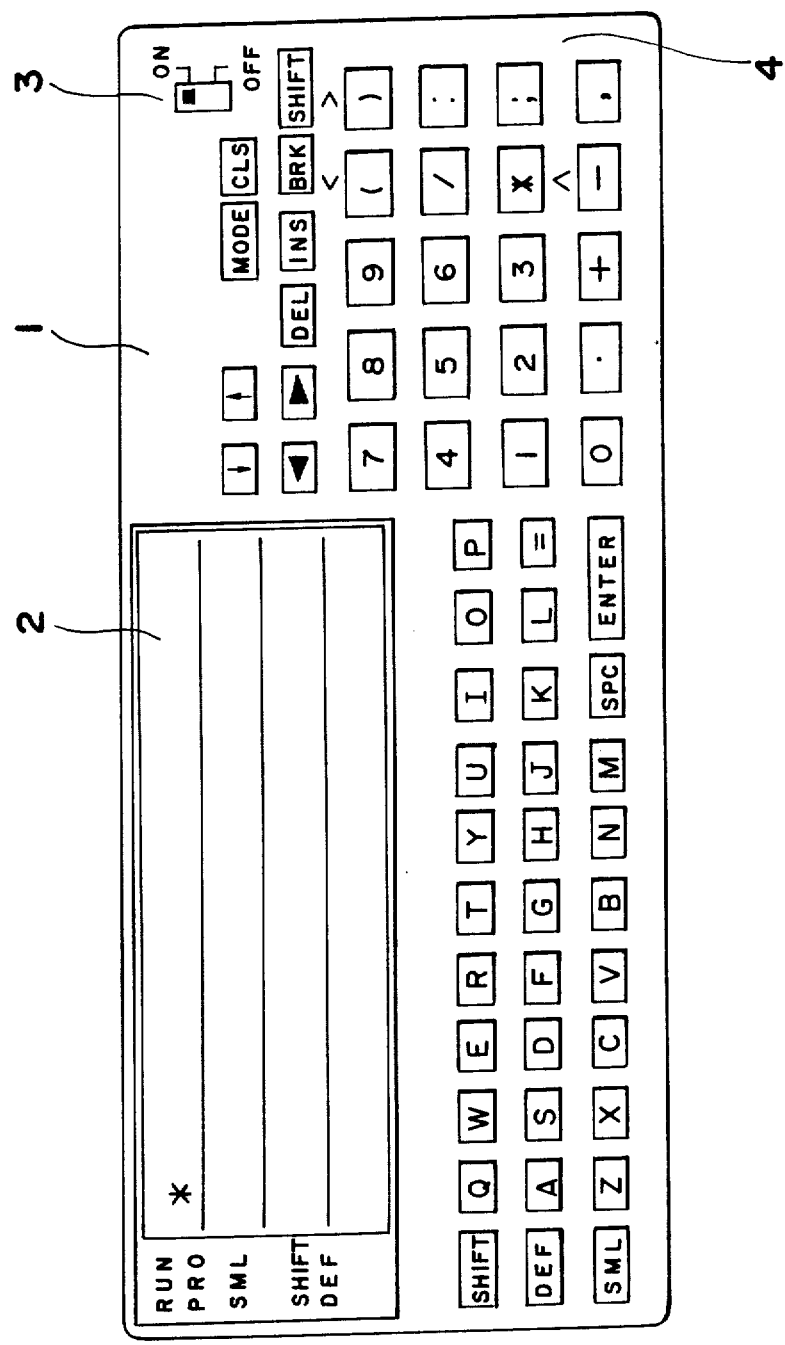
FIG. 1 is a top plan view of a pocket computer according to a preferred embodiment of the present invention.

Referring to FIG. 1, a pocket computer according to the present invention is shown. A reference number 1 designates a body, 2 designates a display panel, 3 designates a power switch, and 4 designates a key alignment through which data are inputted. The computer operates under two different modes which are TEXT mode; and BASIC mode. It is assumed that a program having the following statements is inputted under the BASIC mode through keys.

10 INPUT A; B
20 X=A+B
30 PRINT A; B; X

In this case, in a similar manner to the prior art pocket computers, the instruction, such as "INPUT" or "PRINT", is converted to a one-byte intervening code, and is stored in a memory unit.

However, when the same program is inputted under the TEXT mode, "INPUT" and "PRINT" will be stored in the memory unit in the same manner as the other ordinary characters, such as "A", ";" and "=", using the ASCII code. Thus, when a text file is formed using the ASCII code, such a text file can be applied to a different computer through a suitable interface, such as an RS232C interface. And yet the program based on that text file can be processed in a different computer.

Also, if a program expressed by the intervening code under the BASIC mode is already stored in the computer, the program in the intervening code will be automatically converted to a program in the ASCII code, when the mode is changed from BASIC mode to TEXT mode. Furthermore, in the case where a program in the ASCII code is transferred from a different type of computer or external memory device and loaded to the computer of the present invention, the program in the ASCII code will be converted automatically to a program in the intervening code upon change of the mode from TEXT to BASIC. Therefore, the transferred and loaded program can be used in the computer of the present invention.

Moreover, when it is desire to compile the program regardless of the other computers, it is possible to form a program under BASIC or TEXT mode, as desired.

For example, according to the above exemplification of the program, an amendment of a statement in line 30 from "PRINT A; B; X" to "LPRINT A; B; X" can be done as follows. According to the prior art, under the BASIC mode, "PRINT" is already stored as a one-byte intervening code and, therefore, the insertion of "L" in front of such a one-byte intervening code will not result in "LPRINT". Therefore, under the BASIC mode, it is necessary to delete "PRINT" completely and write a new word "LPRINT". But, according to the present invention, even under the BASIC mode, the mode is temporarily changed from BASIC to TEXT. Then, under the TEXT mode, "L" is inserted in front of "PRINT". Thereafter the mode is retuned back to BASIC mode, thereby completing the amendment very easily even in the BASIC mode.

Next, the operation of the computer according to the present invention will be described.

Figure 2:
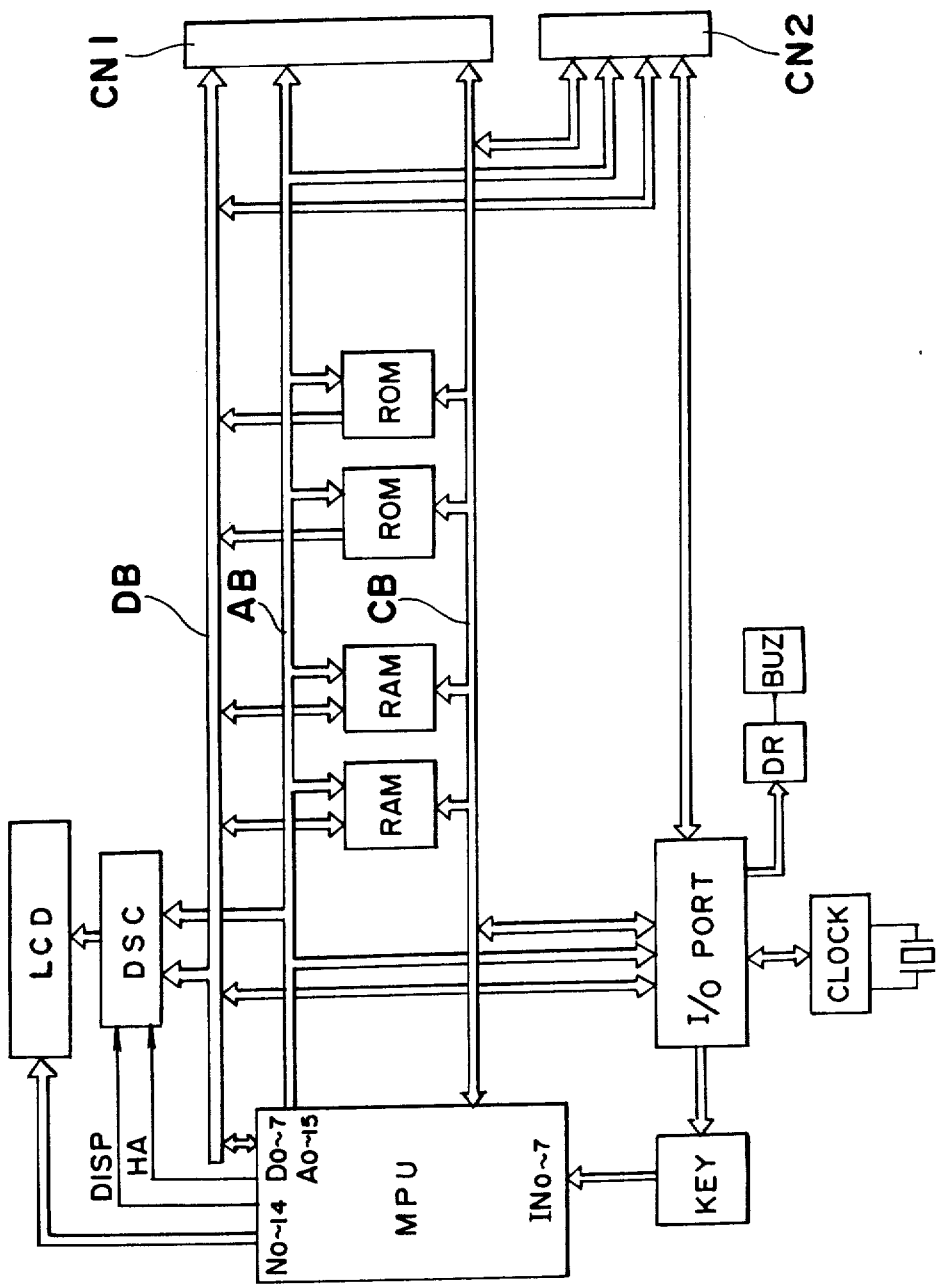
FIG. 2 is a block diagram of the pocket computer of FIG. 1.

Referring to FIG. 2, LCD designates a display portion defined by a liquid crystal device. A display controller DSC is coupled to the display LCD so as to control an on and off condition of the character or symbol segments in the display LCD.

A number of keys are provided at a section KEY shown in FIG. 2. The section KEY receives a key strobe signal from an input/output port, and produces a key return signal to a microprocessor unit MPU.

A plurality of read/write memories, such as the two RAMS shown in FIG. 2, are used as various registers and flag buffers, and are also used for storing various programs.

Also, a plurality of read only memories, such as the two ROMs as shown in FIG. 2, are used as an interpreter to execute a program, and are pre-stored with control programs.

A connector CN1 is provided for connecting ROMs and RAMs as a module. The ROMs and RAMs are connected to an address bus AB, a data bus DB and a control bus CB.

An input/output port is also connected to address bus AB, data bus DB and control bus CB, and serves as an interface for the MPU. Also connected to the input/output port are a clock pulse generator and a sound producer defined by a driver DR and a buzzer BUZ. The I/O port is provided for controlling the input and output of signals to these devices connected thereto. More specifically, the I/O port produces key strobe signal to the KEY section; I/O port provides and receives data of time and date from the CLOCK; and the I/O port provides a drive signal to driver DR for the buzzer sound.

A connector CN2 is provided for connecting the computer with various external devices, such as a data recorder, a printer, another computer, or an external memory device.

The microprocessor unit MPU produces a synchronizing signal HA and an on/off signal DISP to display controller DSC. It also produces back plate signals $H_0$-$H_{15}$ to display LCD. Display controller DSC contains display memories which correspond to various display segments. Therefore, each segment corresponds to one bit. Thus, when a bit pattern is stored in the display memories, a desired character or symbol appears, and can be viewed on the display LCD.

As shown in FIG. 1, an "ENTER" key is provided in the KEY section. In order to set the TEXT mode, the keys are depressed in the order of "T", "E", "X", "T", and "ENTER".

Figure 3:
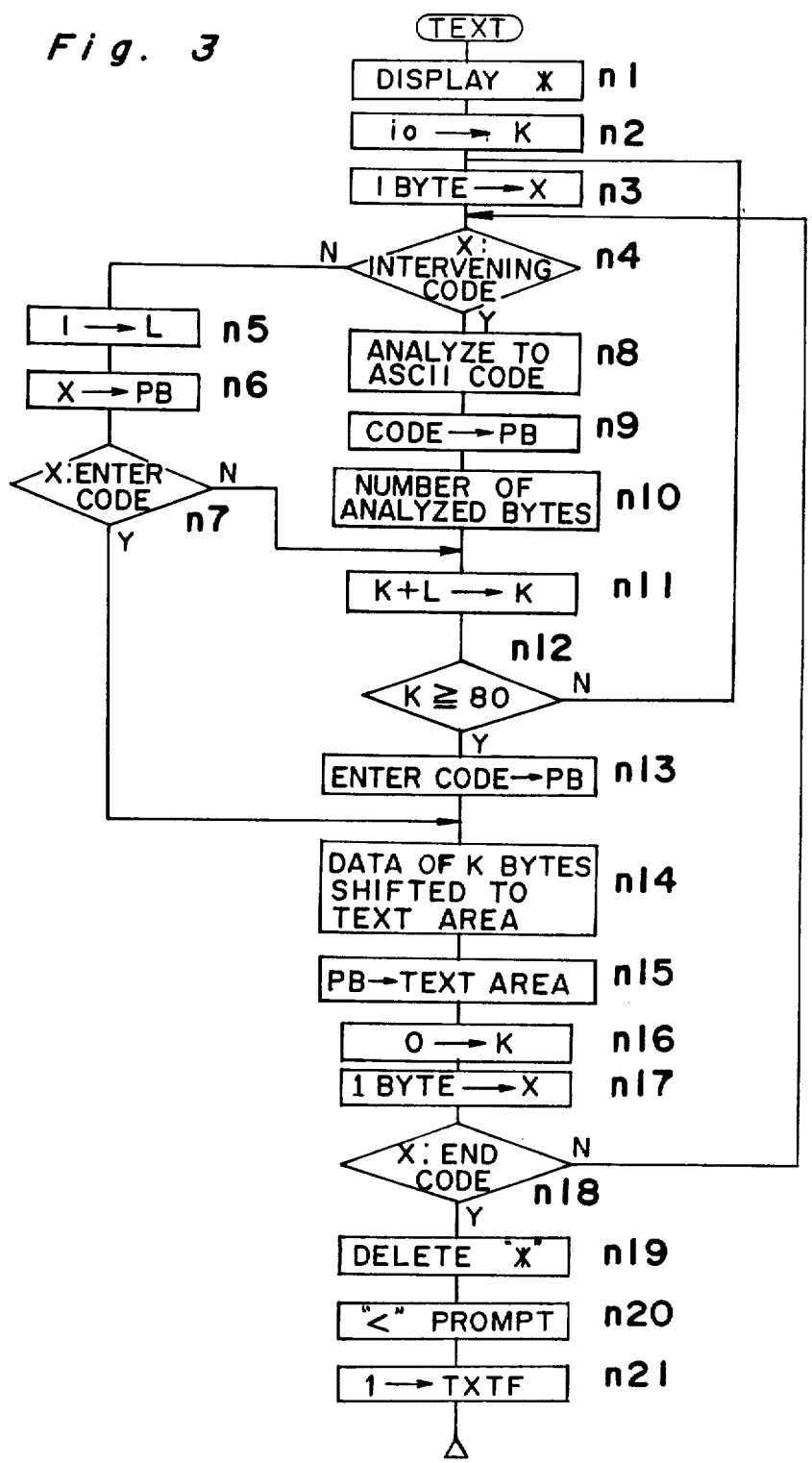
FIG. 3 is a flow chart showing an operation under a TEXT mode.

Referring to FIG. 3, a flow chart showing the operation for converting the program coding from the intervening code to ASCII code is illustrated.

The program in the intervening code is previously stored in the computer. First, as indicated at the top left corner of FIG. 1, an asterisk mark "*" is displayed in the first line, right most end in display panel 2. The asterisk mark "*" is used as a symbol that indicates that the mode is being changed to the TEXT mode. The converting of the program coding to the ASCII code is fundamentally carried out line-by-line until the complete program is converted.

After "*" is displayed, a word number counter K for counting the number of words in one line is reset. Then, the program is stored, from the beginning, in a onebyte register X, and it is detected whether or not the stored code is an intervening code (at steps n2, n3 and n4).

The intervening code uses codes 90H - EFH (hexadecimal numbering system) which are other than those used in ASCII code which is defined by alphanumeric and symbols, such as A, B, C, etc. and 1, 2, 3, etc. According to the intervening code, one of these codes 90H - EFH represents one statement, such as "INPUT", and similarly, another code represents one command, such as "PRINT". In the case where the contents of the register X is not an intervening code, it means that the program is given in ASCII code. In such a case, the contents of the register X are transferred to buffer PB. In this instant, a number of bytes which are applied to buffer PB, in this case "1", is loaded in a counter L (steps n5 and n6). Thereafter, it is detected whether the contents of register X is the end code of the program line, that is "ENTER" code, or not.

If the contents of the register X are detected as an intervening code, a process for analyzing the intervening code and for establishing an ASCII code is carried out (step n8). For example, if the intervening code corresponds to a command "PRINT", it is analyzed to five ASCII codes, "P", "R", "I", "N", and "T". This analysis is done by using a table stored in the ROM in which each intervening code and its spelling are stored correspondingly. The analyzed codes, in this case "P", "R", "I", "N", and "T" are serially transferred to buffer PB (step n9). In this case, these codes are loaded at a place next to a place carrying a code stored in the previous operation. Also, at this instant, the number of bytes transferred to buffer PB is stored in counter L (step n10).

Next, the number counted by the counter K is renewed so that the number in the counter K is equal to the total number of bytes transferred. It is detected whether the total number is less than 80. When the total number is less than 80, more bytes can be transferred. Therefore, by repeating the above procedure, each line of the program is converted to ASCII code. When the end code of the program line, that is "ENTER" code, is transferred to the buffer PB, a text area is shifted by an amount equal to an amount corresponding to the contents of the counter K, that is the number of total bytes transferred, so as to clear an area for loading new data (steps n7-n14).

Then the contents of the buffer PB are transferred to the cleared area (step n15). Thereafter, it is detected whether the end code FFH indicating the end of the program is present or not. If the received code is not the end code FFH, it is understood that the program is still continuing. Thus, in a similar manner to the above, the newly obtained program line is converted from intervening code to ASCII code (steps n16, n17, n18 and n4). Then, when the end code FFH is received, the asterisk mark "*", which has been displayed in display panel 2, is deleted (step n19) so as to indicate that the conversion from intervening code to ASCII code has been completed.

At step n12, when the contents of the counter K is equal to or greater than 80, that is when the data exceeds the capacity of the buffer PB, the overflow data can not be converted to the ASCII code. Therefore, the ENTER code (representing the end-of-line) is forcibly inserted at the 80th digit place of the buffer PB.

Figure 5A:
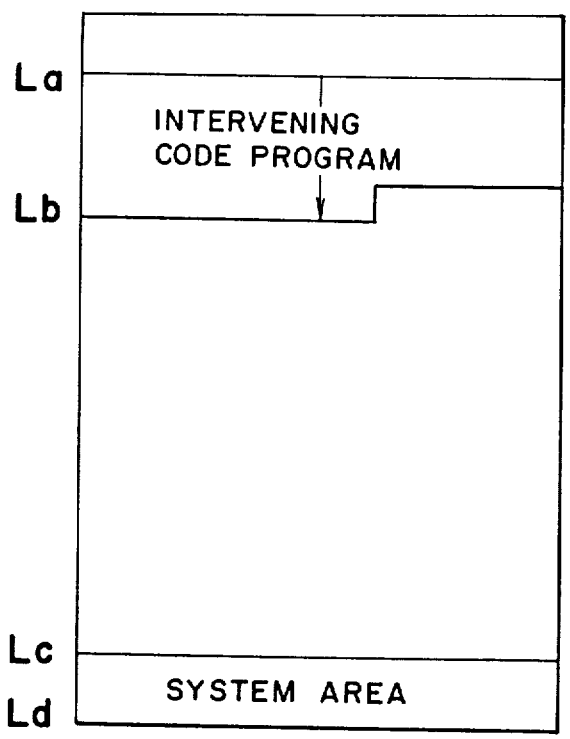
FIGS. 5a and 5b are diagrammatic views showing memory areas in the pocket computer.
Figure 5B:
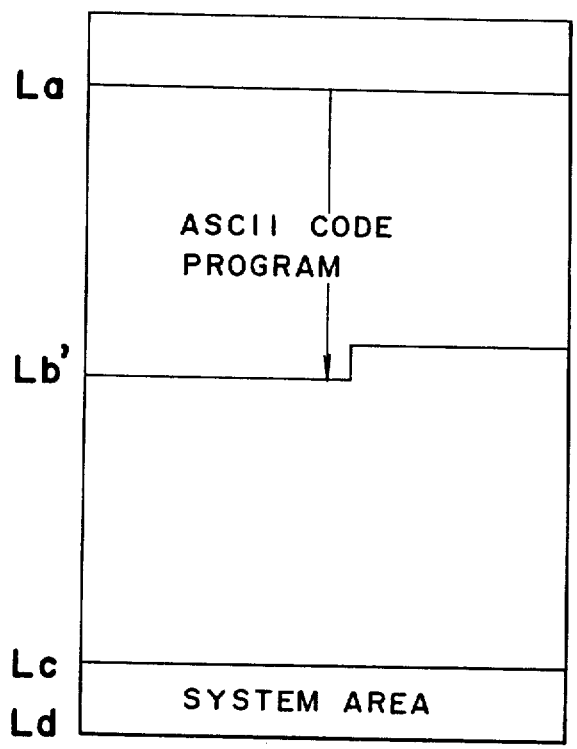

Referring to FIGS. 5a and 5b, a memory area before and after the conversion is shown. An area defined between lines La and Lc is a text area for storing data such as program. The data storing starts from line La towards line Lc. Before the conversion, the intervening program is stored in an area defined between lines La and Lb, as indicated in FIG. 5a. After the conversion, the ASCII program is stored in an area defined between lines La and Lb', as indicated in FIG. 5b. As is apparent from the drawings, area La-Lb' (FIG. 5b) partly overlaps with the area La-Lb (FIG. 5a). An area defined between lines Lc and Ld is preserved as a working area for the buffer PB, counters K and L and register X.

When the above described conversion is complete, the mode is changed from the BASIC mode to TEXT mode. To indicate that the mode is a TEXT mode, a "<" is used for a prompt mark showing the standby condition for the key input. Furthermore, a flag TXTF representing the TEXT mode is set (steps n20 and n21).

To return the mode back to BASIC, key input of "B", "A", "S", "I", "C" and "ENTER" is effected. Next, an operation for converting the program code from ASCII code, which is already stored in the text area, to intervening code is described.

Figure 4:
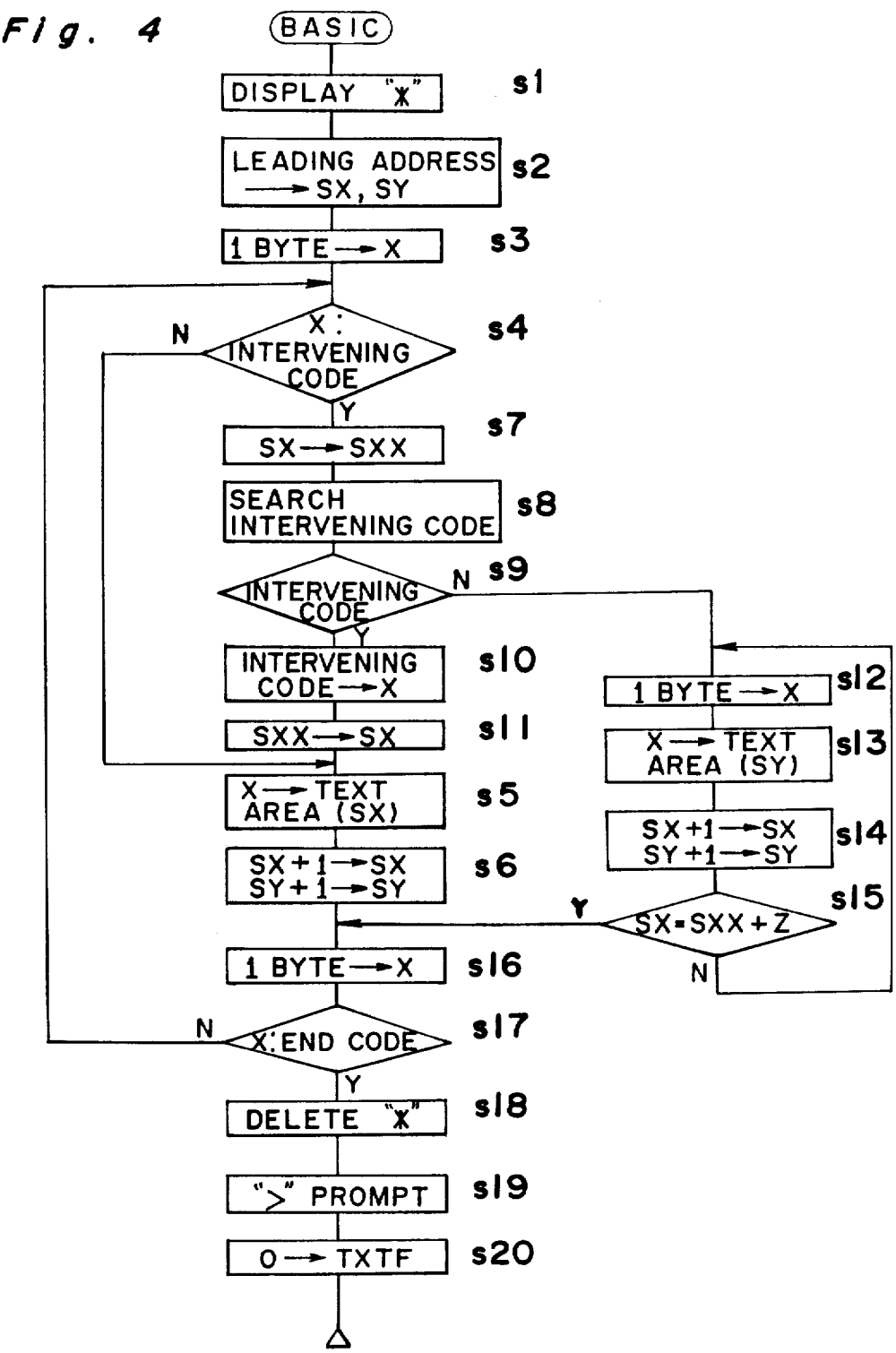
FIG. 4 is a flow chart showing an operation under a BASIC mode.

Referring to FIG. 4, a flow chart for the conversion from ASCII code to intervening code is shown. Generally, a statement or command expressed by the ASCII code requires a number of characters, whereas the same expressed by the intervening code requires only one byte. Therefore, the total area necessary for storing the program in ASCII code will be greater than that for storing the program in intervening code. Therefore, the intervening code converted from the ASCII code can be directly loaded in the text area without being temporarily stored in the buffer.

First, the asterisk mark "*" is displayed in the first line, right most end in display panel 2 indicating that the mode is being changed to the BASIC mode. Then, an address indicating the place where the leading point of the program requires conversion is stored, that is address La (FIG. 5a), is stored in a two-byte long pointer SX. Similarly, an address indicating the place where the leading point of the converted program is to be stored, that is address La (FIG. 5b), is stored in a two-byte long pointer SY.

Next, a code stored at the address indicated by the pointer SX is loaded and stored in register X (step s3). Then, it is detected whether the contents of the register X is the first character of a statement or command, or not. If the detected character can not be the first character of a statement or command, it is a character which can not be converted to intervening code, such as an alphanumeric or symbol. In this case, the content of the register X is transferred directly to a place designated by the address indicated by the pointer SY (steps s4 and s5). If the detected character is the first character of any one of the statements or commands, the characters which follow the detected character will define a statement or command. Then, a table listing the intervening codes is searched as the comparison takes place serially with each character. In this case, the search is carried out such that the pointer for detecting any match with a statement or document in the list is shifted to SXX (steps s7 and s8). If it matches with a statement or comment in the intervening code table, an intervening code corresponding to that statement or comment is stored in the register X. Then, the pointer SX is renewed to pointer SXX (steps s9, s10 and s11). In this case, SXX corresponds to the end position of a statement or comment.

The intervening code obtained in the above described manner is transferred to a text area indicated by the pointer SY. Thereafter, each of the pointers SX and SY are incremented by "1" (step s5 and s6). There may be a case where the starting character is the same, but the entire word is not a statement or a command. In such a case no statement or commend is found in the intervening code table. In this case, a code stored at the address SX is transferred to register X, and the transferred code is further transferred to a text area designated by the pointer SY. Then, for the next transfer, the pointers SX and SY are incremented (step s9, s12, s13, s14). Then it is transferred to a position compared with the table, that is to the text area indicated by the pointer SXX (step s15). After the above process, the contents of the address indicated by SX is loaded in the register X, for the detection whether the loaded code represents the end code of the program. If it is not the end code, the above process is repeated. If it is the end code, the conversion of the program is completed. Then, the asterisk "*" is deleted. Then, to indicate that the mode is a BASIC mode, a ">" is used for a prompt mark showing the standby condition for the key input. Furthermore, the flag TXTF representing the TEXT mode is reset (steps s17, s18, s19 and s20).

As has been described above, by the change of the mode to TEXT mode, the intervening code program stored previously is automatically converted to ASCII code program. Or, by the change of the mode to BASIC mode, the ACII code program is automatically converted to intervening code program. Also, when a program or any text is inputted through the keys under the TEXT mode, such a program or text will be stored in the text area in the form of ASCII code. However, if the mode is BASIC mode, the program or text will be stored in the form of intervening code.

Referring to FIGS. 6 and 7, flowcharts for key input operations are shown. When a character key, such as an alphanumeric key or a symbol key is depressed, its key code in the form of ASCII is stored in a buffer PB. Then, upon depression of the "ENTER" key, the contents of the buffer PB will be transferred directly and sequentially to the text area, if the mode is TEXT mode, that is when the flag TXTF is "1". If the mode is BASIC mode, that is when the flag TXTF is "0", the contents of the buffer PB will be converted to the intervening code. The converted code will be transferred, serially to the text area at a certain address.

As has been fully described above, according to the present invention, the conversion of intervening code program to ASCII code program, or vise versa, can be done automatically and simply. Thus, a program which is prepared by the computer of the present invention can be operated in a different computer having different coding system.

Although the present invention has been fully described with reference to preferred embodiment, many modifications and variations thereof will now be apparent to those skilled in the art, and the scope of the present invention is therefore to be limited not by the details of the preferred embodiment described above, but only by the terms of the appended claims.

What is claimed is:

1. A text compiling device comprising:
   first memory means for storing an intervening code program in which a statement or comment is represented by a code;
   reading means for reading the intervening code program stored in said first memory means;
   means for converting the read intervening code program to an ASCII code program; and
   second memory means for storing the converted ASCII code program.

2. A text compiling device according to claim 1, wherein said first and second memory means are defined by the same memory unit.

3. A text compiling device comprising:
   first memory means for storing an ASCII code program;
   reading means for reading the ASCII code program stored in said first memory means;
   means for converting the read ASCII code program to an intervening code program in which a statement or comment is represented by a code; and
   second memory means for storing the converted intervening code program.

4. A text compiling device according to claim 3, wherein said first and second memory means are defined by the same memory unit.

5. A text compiling device comprising:
   input means for inputting program data into said text compiling device, said input means being operable in either of a first coding system or a second coding system;
   first memory means for storing program data input in said first coding system;
   means for converting stored program data of said first coding system into said second coding system;
   second memory means for storing said converted program in said second coding system; and
   means for converting stored program data in said second coding system into said first coding system.

6. The text compiling device according to claim 5, wherein said first and second memory means overlap to enable conversion between said first coding system and said second coding system.

* * * * *